US010540993B2

(12) United States Patent
Greene (10) Patent No.: US 10,540,993 B2
(45) Date of Patent: *Jan. 21, 2020

(54) AUDIO FINGERPRINTING BASED ON AUDIO ENERGY CHARACTERISTICS

(71) Applicant: Source Digital, Inc., Barto, PA (US)

(72) Inventor: Patrick Greene, Van Nuys, CA (US)

(73) Assignee: Source Digital, Inc., Barto, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/674,343

(22) Filed: Aug. 10, 2017

(65) Prior Publication Data
US 2017/0365276 A1 Dec. 21, 2017

Related U.S. Application Data

(63) Continuation of application No. 15/285,984, filed on Oct. 5, 2016, now Pat. No. 9,786,298, which is a
(Continued)

(51) Int. Cl.
*G06F 17/00* (2019.01)
*G10L 25/54* (2013.01)
(Continued)

(52) U.S. Cl.
CPC ............ *G10L 25/54* (2013.01); *G06F 16/632* (2019.01); *G06F 16/683* (2019.01);
(Continued)

(58) Field of Classification Search
CPC ....... G10L 25/54; G10L 25/21; G10L 19/018; G06F 17/30743; G06F 17/30755;
(Continued)

(56) References Cited

U.S. PATENT DOCUMENTS

| 5,874,955 A | 2/1999 | Rogowitz et al. |
|---|---|---|
| 9,136,965 B2 | 9/2015 | Topchy et al. |

(Continued)

FOREIGN PATENT DOCUMENTS

WO 03000091990 A1 11/2003

OTHER PUBLICATIONS

International Search Report for Co-Pending Patent Application No. PCT/IB2017/052033, dated Jun. 9, 2017.
(Continued)

*Primary Examiner* — Fan S Tsang
*Assistant Examiner* — David Siegel
(74) *Attorney, Agent, or Firm* — Renner, Otto, Boisselle & Sklar, LLP (57) ABSTRACT

Audio fingerprinting includes obtaining audio samples of a piece of audio, generating frequency representations of the audio samples, identifying increasing and decreasing energy regions in frequency bands of the frequency representations, and generating hashes of features of the piece of audio. Each hash of features corresponds to portions of the identified energy regions appearing in a respective time window. Each feature is defined as a numeric value that encodes information representing: a frequency band of an energy region appearing in the respective time window, whether the energy region appearing in the respective time window is an increasing energy region or whether the energy region appearing in the respective time window is a decreasing energy region, and a placement of the energy region appearing in the respective time window.

16 Claims, 9 Drawing Sheets

Related U.S. Application Data continuation-in-part of application No. 15/094,538, filed on Apr. 8, 2016, now Pat. No. 10,397,663.

(51) Int. Cl.
| | |
|---|---|
| *G10L 25/21* | (2013.01) |
| *G06F 16/632* | (2019.01) |
| *G06F 16/683* | (2019.01) |
| *G10H 1/00* | (2006.01) |

(52) U.S. Cl.
CPC .......... *G10H 1/0008* (2013.01); *G10L 25/21* (2013.01); *G10H 2210/031* (2013.01); *G10H 2240/141* (2013.01); *G10H 2250/235* (2013.01); *G10H 2250/261* (2013.01)

(58) Field of Classification Search
CPC .......... G06F 17/3074; G06F 17/30109; G06F 16/683; G06F 16/632; G10H 2240/141; G10H 1/0008; G10H 2210/031; G10H 2250/235; G10H 2250/261; Y02D 10/45
See application file for complete search history.

(56) References Cited

U.S. PATENT DOCUMENTS

| | | | |
|---|---|---|---|
| 9,183,849 | B2 | 11/2015 | Neuhauser et al. |
| 9,195,649 | B2 | 11/2015 | Neuhauser et al. |
| 9,208,790 | B2 | 12/2015 | Bilobrov |
| 9,268,845 | B1 | 2/2016 | Sharif et al. |
| 9,275,427 | B1* | 3/2016 | Sharifi .................. G06T 1/0021 |
| 9,326,044 | B2 | 4/2016 | Topchy et al. |
| 9,361,370 | B2 | 6/2016 | Wang et al. |
| 9,368,151 | B2 | 6/2016 | Pello et al. |
| 9,374,374 | B2 | 6/2016 | Steinberg et al. |
| 9,384,272 | B2 | 7/2016 | Bertin-Mahieux et al. |
| 9,384,273 | B1 | 7/2016 | Roblek et al. |
| 9,401,153 | B2 | 7/2016 | Sharma et al. |
| 9,401,154 | B2 | 7/2016 | Wang et al. |
| 2002/0056136 | A1 | 5/2002 | Wistendahl |
| 2011/0016172 | A1 | 1/2011 | Shah |
| 2011/0063503 | A1 | 3/2011 | Brand et al. |
| 2011/0321114 | A1 | 12/2011 | Newell |
| 2012/0215329 | A1 | 8/2012 | Jiang |
| 2013/0151970 | A1 | 6/2013 | Achour |
| 2013/0160038 | A1 | 6/2013 | Slaney et al. |
| 2013/0178966 | A1* | 7/2013 | Magnusson, Jr. ........................... G06K 9/00744 700/94 |
| 2013/0259211 | A1* | 10/2013 | Vlack ..................... G10L 25/54 379/88.01 |
| 2014/0189724 | A1 | 7/2014 | Harkness et al. |
| 2014/0277640 | A1 | 9/2014 | Bilobrov |
| 2014/0310006 | A1 | 10/2014 | Anguera Miro |
| 2014/0359079 | A1 | 12/2014 | Weill |
| 2015/0045920 | A1* | 2/2015 | Liu ........................ G06F 16/683 700/94 |
| 2015/0110457 | A1 | 4/2015 | Abecassis et al. |
| 2015/0189347 | A1 | 7/2015 | Oztaskent et al. |
| 2015/0205865 | A1 | 7/2015 | Wang et al. |
| 2015/0287416 | A1* | 10/2015 | Brands .................. G10L 19/018 704/273 |
| 2015/0294368 | A1 | 10/2015 | Russell et al. |
| 2015/0310891 | A1 | 10/2015 | Pello et al. |
| 2015/0319506 | A1 | 11/2015 | Kansara |
| 2016/0005410 | A1 | 1/2016 | Parilov |
| 2016/0021421 | A1* | 1/2016 | Panger ............. H04N 21/42203 725/18 |
| 2016/0027418 | A1 | 1/2016 | Neuhauser et al. |
| 2016/0035332 | A1 | 2/2016 | Neuhauser et al. |
| 2016/0132600 | A1 | 5/2016 | Woodhead et al. |
| 2016/0142854 | A1 | 5/2016 | Fueg et al. |
| 2016/0148620 | A1 | 5/2016 | Bilobrov |
| 2016/0154880 | A1 | 6/2016 | Hoarty |
| 2016/0162844 | A1 | 6/2016 | Rachuri et al. |
| 2016/0187961 | A1 | 6/2016 | Elibol et al. |
| 2016/0210356 | A1 | 7/2016 | Kariyappa et al. |
| 2016/0249093 | A1 | 8/2016 | Stojancic et al. |
| 2016/0249115 | A1 | 8/2016 | Lincke |

OTHER PUBLICATIONS

International Search Report for Co-Pending Patent Application No. PCT/IB2017/052031, dated Jun. 16, 2017.
Anonymous, "Automated Content Recognition—creating content aware ecosystems", CSI Magazine, dated Sep. 2012, pp. 1-16, XP055380079, England.
Shumeet Baluja et al, "Audio Fingerprinting: Combining Computer Vision & Data Stream Processing", IEEE International Conference on Acoustics, Speech and Signal Proessing (ICASSP), Honolulu, Hawaii, USA, dated Apr. 2007, pp. 11-213, XP055380185.

* cited by examiner

AUDIO FINGERPRINTING BASED ON AUDIO ENERGY CHARACTERISTICS

FIELD OF THE INVENTION

The present disclosure relates generally to audio content recognition (ACR), and more specifically to generating audio fingerprints based on audio energy characteristics.

BACKGROUND

Real-time recognition of audio content is being increasingly used in various applications. For example, the name, artist, and/or album of an unknown song may be identified or a particular film may be identified from its soundtrack. ACR algorithms include acoustic fingerprinting, which works by analyzing a segment of audio (music, film, etc.) and generating what are known as fingerprints from characteristics of the audio. To recognize a piece of audio content, an audio fingerprint generated from the piece of audio is compared to a database of reference audio fingerprints.

There are several acoustic fingerprinting algorithms that are in widespread use today. A common example is the Shazaam app which identifies the song that a user is listening by using acoustic fingerprinting. Other examples include Gracenote and MusicBrainz.

Conventionally, however, audio content recognition has been limited at least in that conventional schemes have not provided the ability to detect or align timing of the content, i.e., the current time position with respect to the overall time of the content. Other limitations of conventional audio content recognition include the relative large size of the fingerprints, the relative complexity of the content recognition process, and the resulting delay in content recognition.

SUMMARY OF THE INVENTION

The present disclosure provides methods, devices and systems to address these problems. The present disclosure describes audio content recognition algorithms and specifically fingerprint generating algorithms that allow for detecting the position in the audio content with respect to the overall time of the content. For example, the invention disclosed herein may identify, not only the identity of a piece of content (i.e., that the film being watched is Goodfellas), but also that the film is currently at the 3:30 mark. The disclosed invention, moreover, addresses limitations of conventional audio content recognition by providing for relatively small size fingerprints and a relatively straightforward content recognition process resulting in reduced delay in content recognition when compared with conventional techniques.

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
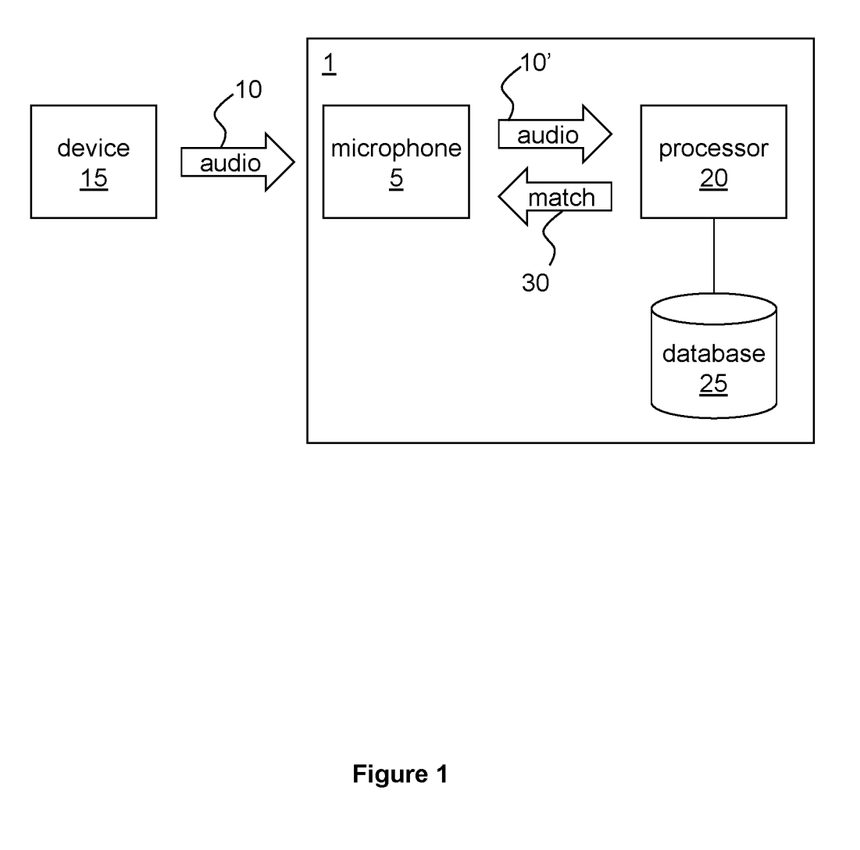
FIG. 1 illustrates a block diagram of an exemplary system for audio fingerprinting.

FIG. 1 illustrates a block diagram of an exemplary system 1 for audio content recognition. In general, the system 1 works by analyzing a segment of audio (e.g., song, film's soundtrack, etc.) and generating fingerprints from the acoustic characteristics of the audio. The system 1 is useful for, for example, identifying content such as a TV show, film, YouTube video that a user may be watching and additionally detecting the position with respect to the overall time of the content. So, for example, the system 1 may identify, not only the identity of a piece of content (i.e., that the film being watched is Goodfellas), but also that the film is currently at the 3:30 mark.

The system 1 may include a microphone 5 that receives audio 10 from content that may be playing on a standard device 15 such as a television, computer, tablet, etc. The system 1 "listens" to the audio 10 using the microphone 5 and provides a version of the audio 10' to a processor 20 which processes the audio 10' to produce a fingerprint and compares the fingerprint to fingerprints previously stored in a storage medium or database 25. If the processor 20 detects a content match (i.e., that the fingerprint of the newly received audio 10' matches a previously stored fingerprint), the processor 20 outputs the match 30, which may include the content ID (e.g., the song or film) and a time within the content such as the above Goodfellas example. Thus, the system 1 processes the audio 10' and outputs the match 30, which may include a content ID and a time offset relative to the start of the content.

There are two main components to any acoustic fingerprinting algorithm, the encoding process and the recognition process.

The encoding process is typically done ahead of time using source or master content to generate master fingerprints (MFP). MFP are the fingerprints which will be stored in the storage medium or database 25 and later compared to, for example, real-time audio to try to obtain a match during the recognition process.

The recognition process is typically done real-time or close to real-time. The system 1 uses the microphone 5 to receive audio 10 from the environment of the system 1. The processor 20 processes the received audio 10' to generate received fingerprints (RFP), which the processor 25 will then compare against the MFP to see if there is a match. The recognition process may be further broken down into two main components: 1) the RFP generation (which involves the same algorithm used when generating the MFP) and 2) the database lookup. Due to the massive amount of data present in audio, generated fingerprints must be compact enough to support fast searching during the database lookup.

Fingerprint generation is the process of taking the incoming stream of audio 10' (received either from the microphone 5 or in recorded form such as an MP4 file) and processing it to obtain its fingerprint. The same algorithm is used for fingerprint generation whether generating the MFP or the RFP.

Figure 2:
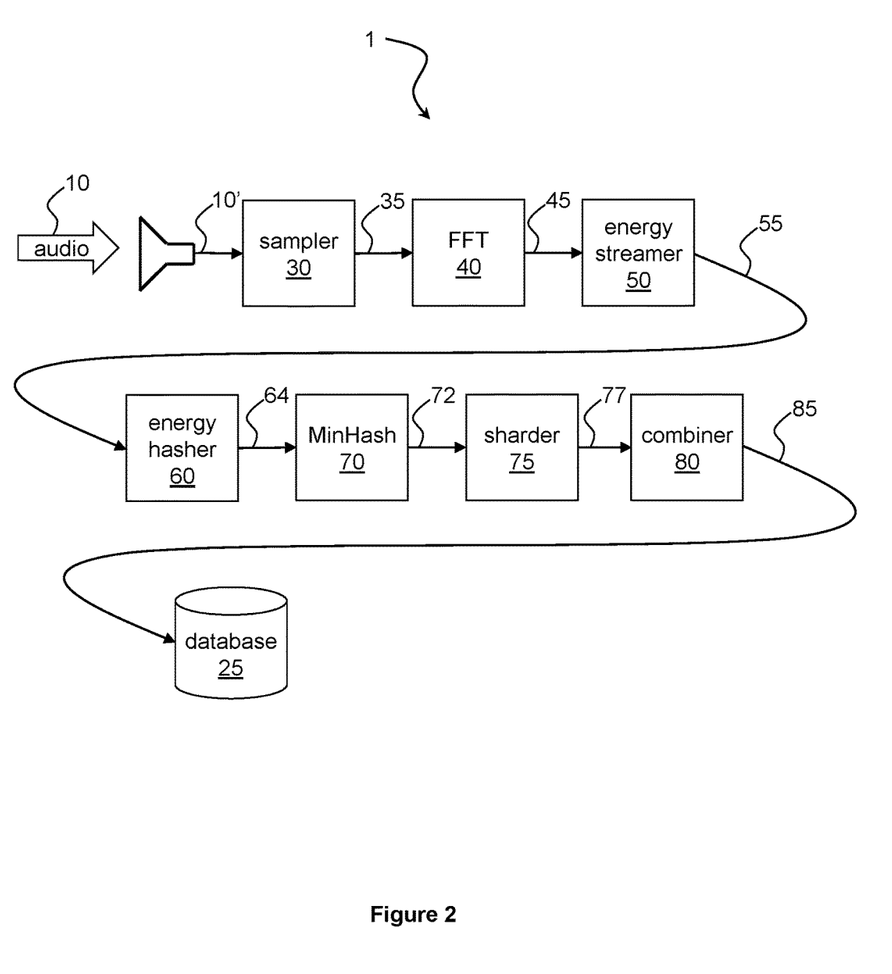
FIG. 2 illustrates a detailed block diagram of the system for audio fingerprinting of FIG. 1.

FIG. 2 illustrates a detailed block diagram of the system 1 of FIG. 1. As discussed above, the system 1 may include the microphone 5 to receive audio 10 from the environment and output the audio signal 10'. In the alternative, the system 1 may receive the audio signal 10' through other methods such as from recorded audio.

Figure 2A:
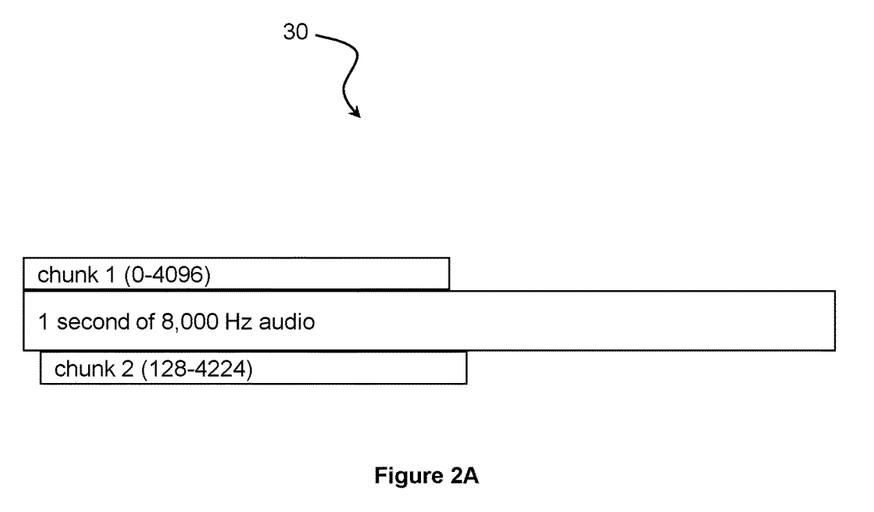
FIG. 2A illustrates an exemplary sampling process.

The system 1 may also include the sampler 30, which samples the audio signal 10'. FIG. 2A illustrates an exemplary sampling process of the sampler 30. In the embodiment of FIG. 2A, the sampler 30 samples the audio signal 10' at an 8 kHz sample rate, with a window size of 4096 samples and a window overlap of 31/32. In other embodiments, the sampler 30 samples the audio signal 10' at sample rates, window sizes and window overlaps different from 8 kHz sample rate, window size of 4096 samples and window overlap of 31/32. The output 35 of the sampler 30 is a series of chunks of audio samples (i.e., chunk 1, chunk 2, etc. of FIG. 2A), each chunk being the window size.

The system 1 of FIG. 2 may also include the FFT 40 which receives the output 35 of the sampler 30. Each chunk of audio samples is processed using the FFT 40 to generate a frequency/bin representation of the audio samples. Sometimes this is called a spectrogram. The output 45 of the FFT 40 includes these spectrograms and the time offset corresponding to each spectrogram (i.e., the time at which each occurred).

The system 1 may also include energy streamer 50, which identifies energy regions in frequency bins or bands of the spectrograms. For example, let's assume that the audio signal 10 is a sine wave at 200 Hz. Imagine that this sine wave is playing and we continue to increase the volume of the player. The magnitude of the FFT bin at 200 Hz will increase over time. The energy streamer 50 monitors certain ranges of frequencies within the FFT output 45 to identify periods of increasing energy and periods of decreasing energy. These periods of increasing or decreasing energy are referred to here as energy regions. In the 200 Hz example above, an energy region (i.e., an increasing energy region) would be identified for 200 Hz because its energy was increasing as the volume increased. If we were turning the volume down, an energy region would also be generated, a decreasing energy region.

If in the above example, however, the volume of the audio signal 10 continually fluctuated between high volume and low volume, an energy region would likely not be generated because the energy streamer 50 looks for periods of increasing energy and for periods of decreasing energy. Such a fluctuating energy period may have a net energy change close to zero, on the average not increasing or decreasing from start to end. Such fluctuating energy periods do not generate energy regions and are ignored.

In one embodiment, the frequency range that the energy streamer 50 monitors is between 200 Hz and 3,300 Hz. In the above embodiment where the sampler 30 samples audio 10' at 8,000 Hz, the FFT chunks in the output 45 of the FFT 40 contain frequency bins between 0 Hz and 4,000 Hz because sampling always results in a loss of at least half accuracy. Even though the audio 10 is sampled at 8,000 Hz, we can only accurately get frequencies at half that sample rate (or 4,000 Hz). This is referred to as the Nyquist-Shannon Sampling Theorem. In other embodiments, the frequency ranges that the energy streamer 50 monitors are other than between 200 Hz and 3,300 Hz.

The frequency representations or spectrograms in the output 45 of the FFT 40 may be divided in frequency bands. For example, band 1 might represent frequencies between 200 Hz and 350 Hz, band 2 might represent 350 Hz-450 Hz, and so on. Something to note is that the human ear does not hear frequencies in a linear fashion, but rather a logarithmic fashion. For this reason, in one embodiment, the size or bandwidth of each band may decrease logarithmically so that the lower frequency bands (starting at 200 Hz in our example) are the largest bands and the higher frequency bands (up to 3,300 Hz in our example) are the smallest bands.

In one embodiment, the energy streamer 50 utilizes 44 energy bands in the range of 200 Hz-3,300 Hz and those are logarithmically decreasing in size. Each energy region that the energy streamer 50 identifies has a band number, for example the first band (i.e., band 1) starts at 200 Hz; the last band (i.e., band 44) ends at 3,300 Hz. In other embodiments, the energy streamer 50 utilizes more or less than 44 energy bands and the energy bands may be in ranges other than 200 Hz-3,300 Hz.

Figure 2B:
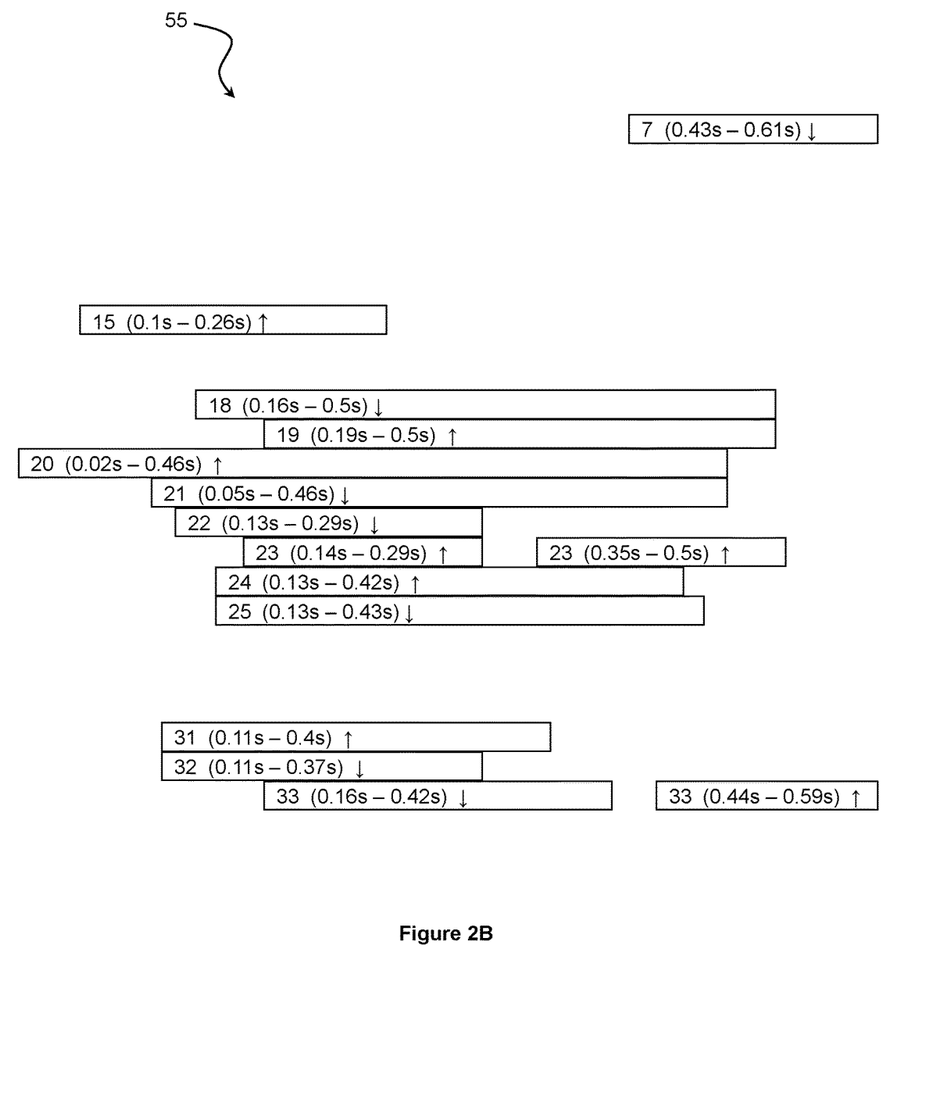
FIG. 2B illustrates a graphical representation of exemplary energy regions for a portion of a film.

FIG. 2B illustrates a graphical representation of exemplary energy regions 55 for a portion of a film. Each energy region tracks its frequency band, the start/end time of the region with respect to the entire sequence of audio, and whether energy was increasing or decreasing. In the example of FIG. 2B, each region includes either an up arrow indicating that the region is an increasing energy region or a down arrow indicating that the region is a decreasing energy region. For example, the first region that appears on the left is on frequency band 20, begins at time 0.02 seconds and ends at time 0.46 seconds, and it is an increasing energy region.

To summarize, the energy streamer 50 processes the FFT chunks in the output 45 of the FFT 40 to identify periods of increasing energy and periods of decreasing energy within each frequency band. The identified increasing and decreasing energy regions 55 have a frequency band number and the start/end time (i.e., the time offset) within the larger audio stream.

Returning to FIG. 2, the system 1 may also include energy hasher 60, which generates hashes of features of the audio samples based on the energy regions 55 identified by the energy streamer 50. The energy hasher 60 operates on the stream 55 of energy regions much in the same way that the sampler 30 operates on the audio signal 10'. The energy hasher 60 has a window size property and a window overlap property as well, however it is now processing the energy regions which are an encoded form of the audio signal 10'. In one embodiment, the energy hasher 60 has a window size of 1000 milliseconds and a window overlap of 950 milliseconds, meaning that the energy hasher's window moves forward in time 50 milliseconds every pass. In other embodiments, the energy hasher 60 has a window size different from 1000 milliseconds or a window overlap different from 950 milliseconds.

The energy hasher 60 analyzes portions of the identified energy regions appearing within time windows to generate hashes (numeric data) of features of the piece of audio. The hashes (i.e., the output 64 of the hasher 60) may be stored in a database for future identification (MFP) or can be compared against hashes already in a database (RFP).

Figure 2C:
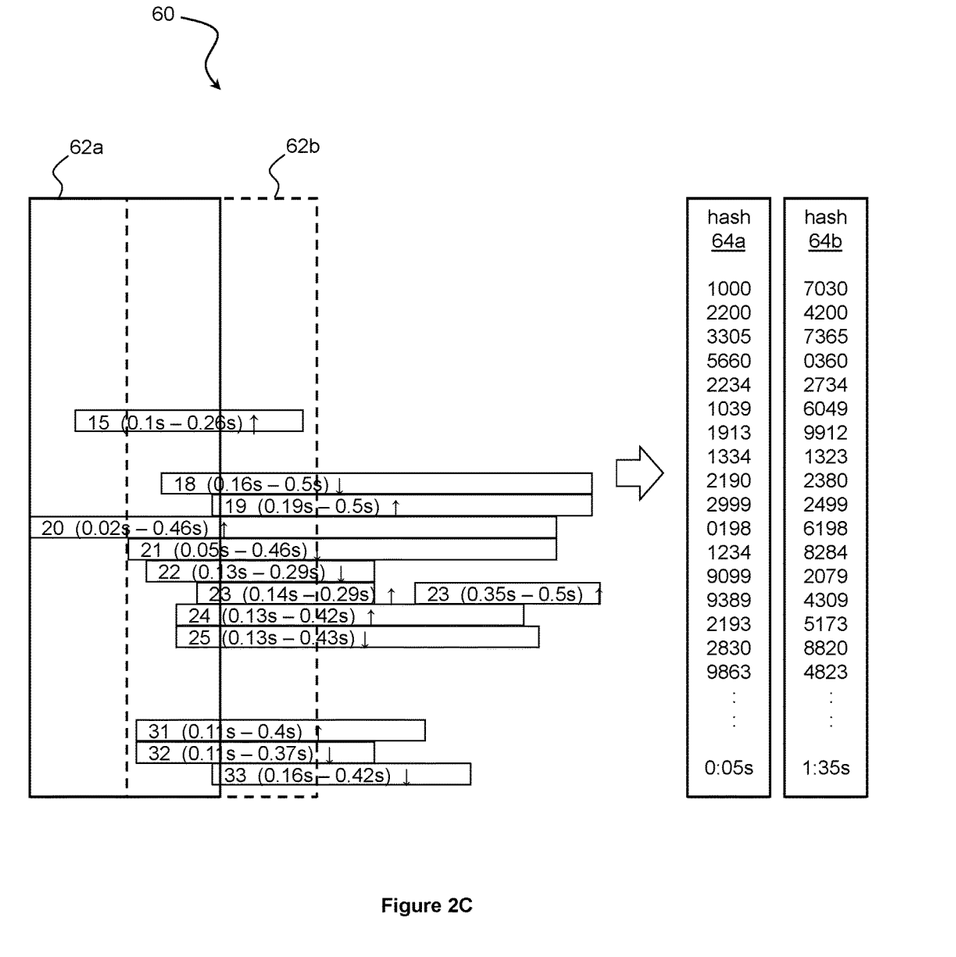
FIG. 2C illustrates a graphical representation of an exemplary energy hasher.

FIG. 2C illustrates a graphical representation of an exemplary energy hasher 60. The energy hasher 60 uses a sliding window 62. The energy hasher 60 moves the window 62 (from, for example, 62a to 62b) and analyzes the portions of the energy regions which fall within the window. The energy hasher 60 creates features (distinct numeric values) based on the energy regions which fall within the current window.

There are eight types of features that may be created for each energy region. Each feature generated is a numeric value which encodes information representing: a) a frequency band of an energy region appearing in the respective time window, b) whether the energy region appearing in the respective time window is an increasing energy region or whether the energy region appearing in the respective time window is a decreasing energy region, and c) placement of the energy region relative to the respective time window.

The placement of the energy region appearing in the respective time window 62 corresponds to one of:

Starts before/ends after window—this means that with respect to the window 62, this energy region started before the window's start and ended after the window's end. Or in other words, the energy region completely encompasses the current window 62;

Starts before/ends within window—this means that with respect to the current window 62, the energy region started before the window start, but ended before the window end;

Starts within/ends after window—this means that the energy region started within the window time frame, but ended after the window end; and Starts within/ends within window—this means that the energy region is completely contained within the windows timeframe.

Each window 62 typically results in many features. Each feature is a number that is a representation of the band number, the energy direction (i.e., increasing or decreasing), and the placement of the energy region with respect to the current window 62.

Each window 62 results in a hash 64 (shown as 64a and 64b corresponding to the windows 62a and 62b, respectively) which is a series of feature numbers and the timing information (0:05 s and 1:35 s) from the energy regions within the time window. A common theme is the consistent passing along of timing information from the sampling level all the way down to the hashing level.

The hashes 64 may be stored in a database for future identification (MFP) or can be compared against hashes already in a database (RFP).

In the embodiment of FIG. 2, however, these hashes 64 of energy features are not the final database representation. The system 1 may also include a MinHash 70. MinHash was originally developed for search engines to represent large amounts of text data in a small amount of space (see, Broder, Andrei Z. (1997), "On the resemblance and containment of documents", Compression and Complexity of Sequences: Proceedings, Positano, Amalfitan Coast, Salerno, Italy, Jun. 11-13, 1997 (PDF), IEEE, pp. 21-29, doi:10.1109/SEQUEN.1997.666900, and Broder, Andrei Z.; Charikar, Moses; Frieze, Alan M.; Mitzenmacher, Michael (1998), "Min-wise independent permutations", Proc. 30th ACM Symposium on Theory of Computing (STOC '98), New York, N.Y., USA: Association for Computing Machinery, pp. 327-336, each of which is hereby incorporated by reference in their entirety). The inventor discovered through experimentation, however, that massive amounts of audio features may also be reduced using MinHash.

MinHash 70 condenses the large amount of features in a hash 64 into a smaller set of numbers. Applying MinHash 70 to the hash 64 results in another series of numbers or MinHash values 72. For example, the hash 64 may include 250 features because that is the number of features that appeared within its corresponding window 62. But there will always be a fixed number (100 for example) of MinHash values 72 after applying MinHash 70 to the hash 64.

The MinHash values 72 may be stored in a database for future identification (MFP) or can be compared against MinHash values already in a database (RFP).

Figure 2D:
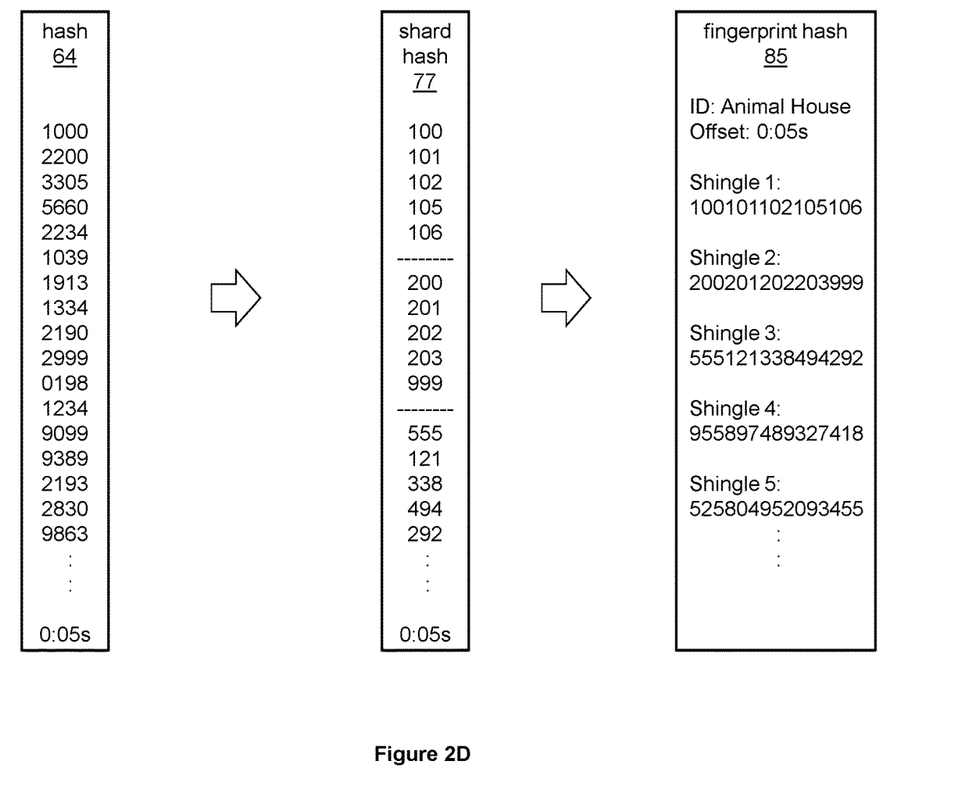
FIG. 2D illustrates graphical representations of exemplary hash, shard MinHash, and fingerprint hash.

In the embodiment of FIG. 2, however, the MinHash values 72 are not the final database representation. The system 1 may also include a sharder 75. Sharding is the grouping of the MinHash values 72 into rows and columns. As shown in the example of FIG. 2D, the sharder 75 may shard the MinHash values 72 using, for example, a shard size of 5 resulting in shard hash 77 having 20 groups, each group having 5 values. The first group of the shard hash 77 has MinHash values 1-5, the second group has MinHash values 6-10, and so on.

The shard hashes 77 may be stored in a database for future identification (MFP) or can be compared against shard hashes already in a database (RFP).

In the embodiment of FIG. 2, however, the shard hashes 77 are not the final database representation. The system 1 may also include a combiner 80, which combines the 5 shard values for any given group of a shard hash 77 into a single 64 bit number, a shingle. As shown in the example of FIG. 2D, the first shard group in the shard hash 77 has values 100, 102, 102, 105, 106. The combiner 80 may combine these numbers into a single 64 bit integer 100102105106 without loss of data. The result is the fingerprint hash 85 which includes the 20 shingles of 64 bits and the timing information from the energy regions within the time window.

Thus the fingerprint hash 85 includes the content ID (a value assigned to the original content), 20 numbers (the shingles) and a time offset (which identifies where in the content the sampled portion or the hash was originally located). The fingerprint hash 85 may be stored in a database 25 for future identification (MFP). Most database systems are highly optimized for searching on numeric values and we have reduced the number of comparisons significantly thus providing for relatively small size fingerprints resulting in reduced delay in content recognition when compared with conventional techniques.

Figure 3:
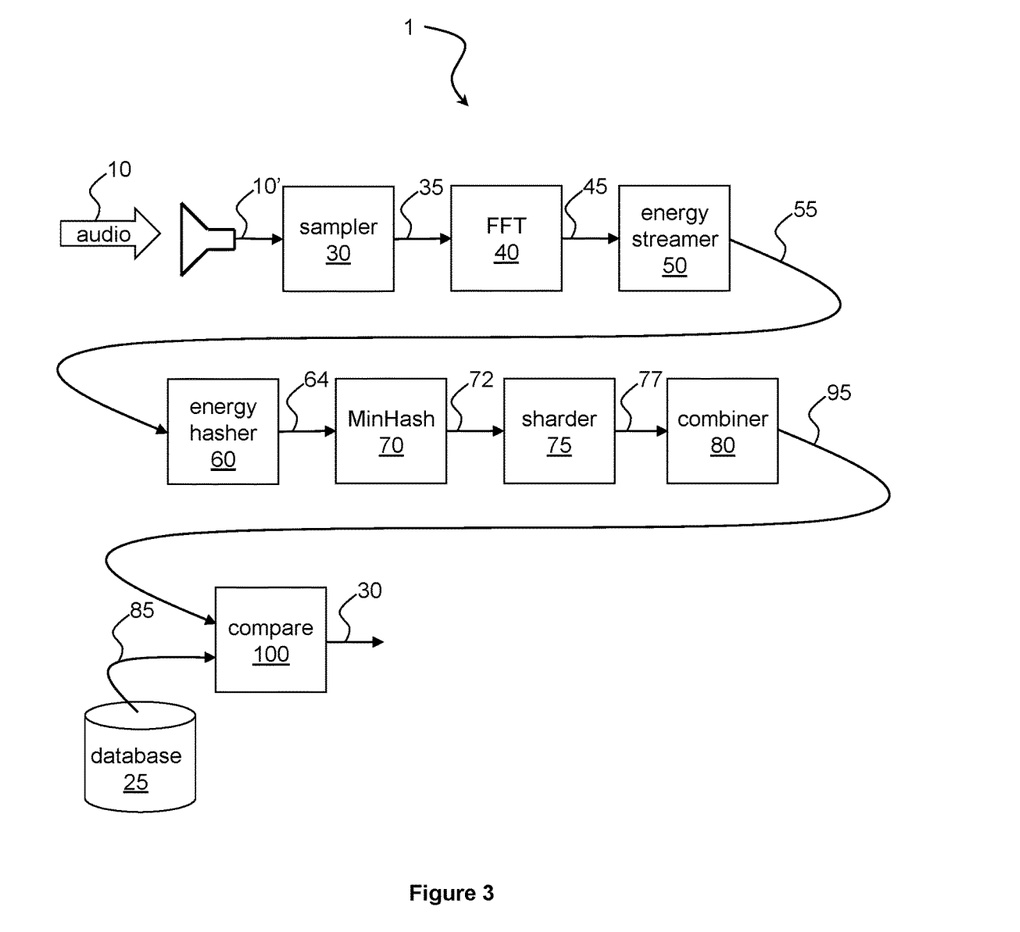
FIG. 3 illustrates the system for audio fingerprinting of FIG. 1 in the context of audio content recognition.

The embodiment of FIG. 2 illustrates the system 1 in the context of MFP generation. FIG. 3 illustrates the system 1 in the context of RFP generation for comparison or matching. In this context, the system 1 may be incorporated within a device such as wireless phone, tablet, computer, etc. FIG. 3 illustrates the same elements as in FIG. 2 and in addition includes the comparator 100.

At work in the context of RFP generation for comparison or matching, the system 1 will open the microphone 5 on the device and start reading audio using the settings as described above (8,000 kHz, etc.) The system 1 will generate fingerprints 95 from this audio in the exact same way that it generated fingerprints 85 when creating the MFP. The only difference is that the time of the fingerprints 95 is a relative time offset from the start of opening the microphone. In this context, the system 1 has no way of knowing the current timing relative to the beginning of, for example, the song or film as it does in the MFP context. So the first fingerprint 95 generated will have a time offset of 0:00 and a minute later, the offset would be 1:00 even if audio is currently 13 minutes into a program. The system 1 has no concept of when a program began, it only knows when recording started so the offset time is always relative for fingerprints 95 generated when creating RFP.

Audio is continuously being recorded from the microphone 5 of the device and fingerprints 95 are being generated. These received fingerprints (RFP) 95 are sent to the comparator 100 where identification happens. The first step in identification may be a database lookup. For example, the SQL query might look like the following:

```
select       *       from      Hashes      where
   ShardValue1=<UploadedShardValue1>            OR
   ShardValue2=<UploadedShardValue2> . . . OR
   ShardValue20=<UploadedShardValue20>
```

The comparator 100 is looking for any hashes in the database where one of the shard row int64 values matches. It should be noted that the shard's actual row number may be important. For example, the comparator 100 may compare the source hash's shard row 1 against the recorded hash's shard row 1 value. This might not be enough, however, because this might result in 500 matches in a large database. Instead, the comparator 100 may keep track of the matches that result from each uploaded fingerprint 95.

So for example, let's say that the database looks like the following (a very simplified example):

| Content ID | Offset Time | Shard Values |
|---|---|---|
| Goodfellas | 0:10 | . . . |
| Goodfellas | 0:11 | . . . |
| Walking Dead | 0:30 | . . . |
| Walking Dead | 0:35 | . . . |
| Mad Men | 0:45 | . . . |
| Mad Men | 0:48 | . . . |

And let's assume two fingerprints 95 are uploaded, a first fingerprint is uploaded at time 0:00 and a second fingerprint is uploaded at time 0:01. The first fingerprint matches Goodfellas at 0:10 and Mad Men at 0:48. The comparator 100 keeps track of this. Now let's say that the second fingerprint matches Goodfellas at 0:11 and Mad Men at 0:45. The time difference between the uploaded fingerprints 95 is 1 second (0:00 and 0:01). We have two matches for Goodfellas and the difference in time between each match is 1 second (0:10 and 0:11). There are also two matches for Mad Men (0:48 and 0:45) but with a time difference of −3 seconds (the second match came before the first match with respect to time). We now have a true match because the time difference between the two matches for Goodfellas and the two fingerprints that were uploaded align in time. The comparator 100 utilizes this type of time alignment matching to ensure that identification is accurate. Database matches for the uploaded fingerprints must align in time for a match to be considered valid.

The comparator 100 may now report that a match has been made. The match 30 includes the content ID for, for example, Goodfellas and a time of, for example, 0:11 (the latest accurate time match). At this point, a device incorporating the system 1 will utilize that content ID to provide some type of user experience. An example of this would be querying web services for metadata about Goodfellas at 0:11 and then displaying, for example, the names of the characters or the actors that are on screen.

Figure 4:
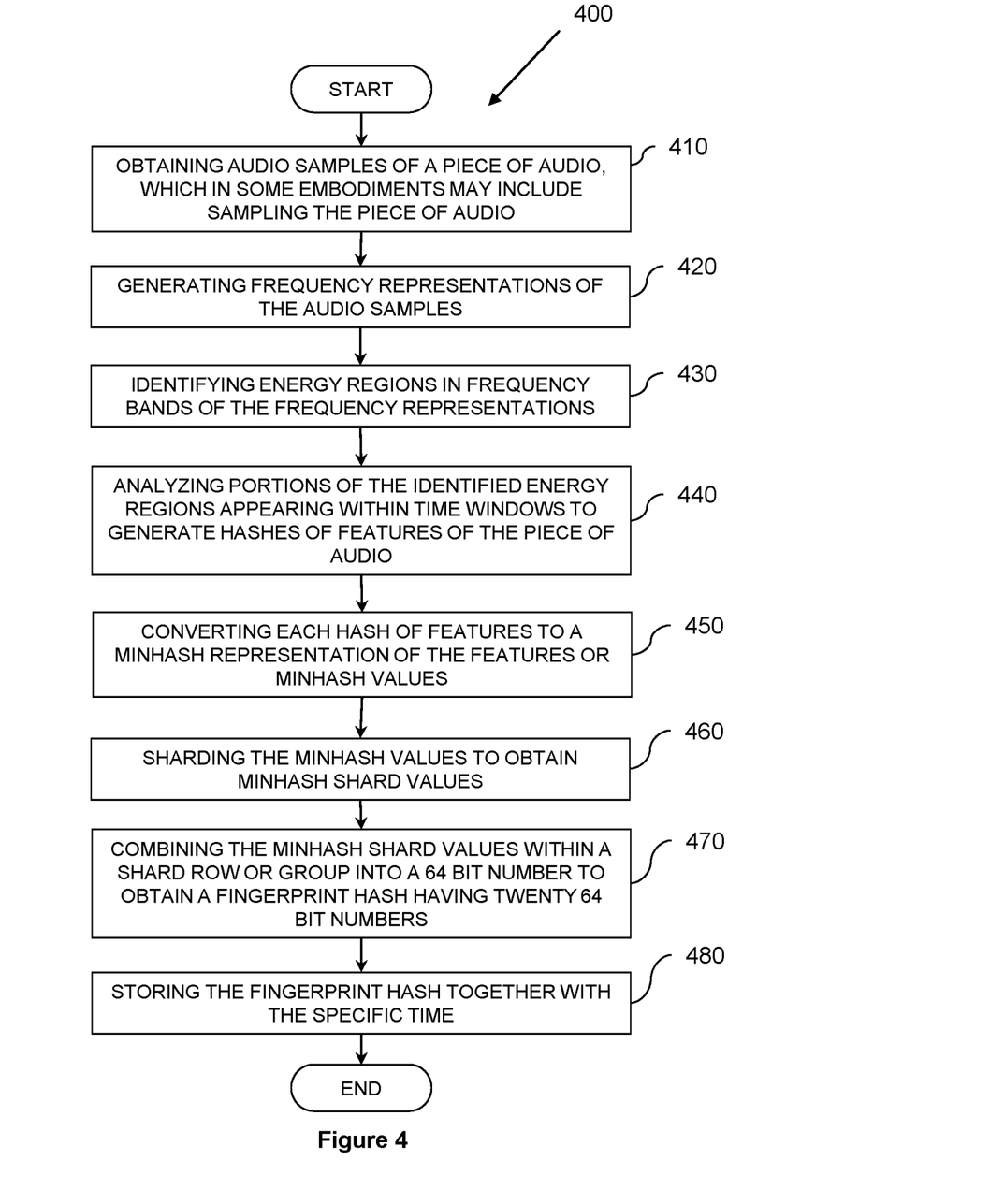
FIG. 4 illustrates a flow diagram for an exemplary method for audio fingerprinting.

Exemplary methods may be better appreciated with reference to the flow diagram of FIG. 4. While for purposes of simplicity of explanation, the illustrated methodologies are shown and described as a series of blocks, it is to be appreciated that the methodologies are not limited by the order of the blocks, as some blocks can occur in different orders or concurrently with other blocks from that shown and described. Moreover, less than all the illustrated blocks may be required to implement an exemplary methodology. Furthermore, additional methodologies, alternative methodologies, or both can employ additional blocks, not illustrated.

In the flow diagrams, blocks denote "processing blocks" that may be implemented with logic. The processing blocks may represent a method step or an apparatus element for performing the method step. The flow diagrams do not depict syntax for any particular programming language, methodology, or style (e.g., procedural, object-oriented). Rather, the flow diagrams illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques.

FIG. 4 illustrates a flow diagram for an exemplary method 400 for audio fingerprinting.

The method 400 includes at 410 obtaining audio samples of a piece of audio, which in some embodiments may include sampling the piece of audio. Each of the audio samples corresponds to a specific time. At 420, the method 400 includes generating frequency representations of the audio samples. At 430, the method 400 includes identifying energy regions in frequency bands of the frequency representations. An energy region may be an increasing energy region or a decreasing energy region, but not both. An increasing energy region is defined as a time region within which audio energy increases from a start time to an end time of the time region and a decreasing energy region is defined as a time region within which audio energy decreases from a start time to an end time of the time region.

The method 400 includes at 440 analyzing portions of the identified energy regions appearing within time windows to generate hashes of features of the piece of audio. Each hash of features corresponds to portions of the identified energy regions appearing in a respective time window. Each feature is defined as a numeric value that encodes information representing: a frequency band of an energy region appearing in the respective time window, whether the energy region appearing in the respective time window is an increasing energy region or whether the energy region appearing in the respective time window is a decreasing energy region, and a placement of the energy region appearing in the respective time window, the placement of the energy region appearing in the respective time window corresponding to one of:

whether the energy region appearing in the respective time window starts before and ends after the respective time window, whether the energy region appearing in the respective time window starts before and ends within the respective time window, whether the energy region appearing in the respective time window starts within and ends after the respective time window, and whether the energy region appearing in the respective time window starts within and ends within the respective time window.

At 450, the method 400 may include converting each hash of features to a MinHash representation of the features or MinHash values. At 460, the method 400 may include sharding the MinHash values to obtain MinHash shard values. At 470, the method 400 may include combining the MinHash shard values within a shard row or group into a 64 bit number to obtain a fingerprint hash having twenty 64 bit numbers. At 480, the method 400 stores the fingerprint hash together with the specific time.

While the figures illustrate various actions occurring in serial, it is to be appreciated that various actions illustrated could occur substantially in parallel, and while actions may be shown occurring in parallel, it is to be appreciated that these actions could occur substantially in series. While a number of processes are described in relation to the illustrated methods, it is to be appreciated that a greater or lesser number of processes could be employed and that lightweight processes, regular processes, threads, and other approaches could be employed. It is to be appreciated that other exemplary methods may, in some cases, also include actions that occur substantially in parallel. The illustrated exemplary methods and other embodiments may operate in real-time, faster than real-time in a software or hardware or hybrid software/hardware implementation, or slower than real time in a software or hardware or hybrid software/hardware implementation.

Figure 5:
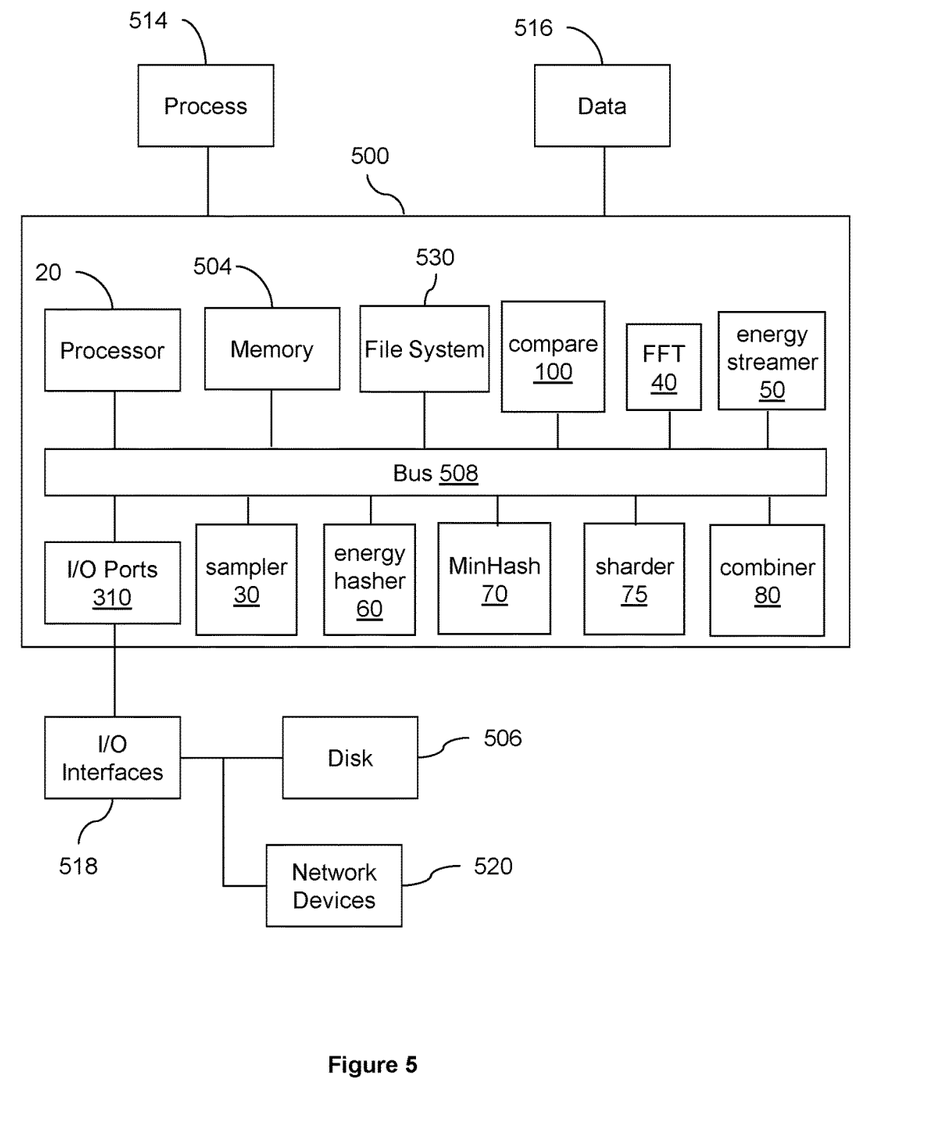
FIG. 5 illustrates a block diagram of an exemplary machine or device for audio fingerprinting.

FIG. 5 illustrates a block diagram of an exemplary machine or device 500 for audio fingerprinting. The device 500 includes the processor 20, a memory 504, and I/O Ports 510 operably connected by a bus 508.

In one example, the device 500 may receive input signals including the audio 10 or 10', the sampled audio 35, the frequency representations 45, the energy regions 55, the hashes 64, the MinHash values 72, the shard MinHash values 77, the fingerprint hashes 85 and 95, etc. via, for example, I/O Ports 510 or I/O Interfaces 518. The device 500 may also include the sampler 30, FFT 40, energy streamer 50, energy hasher 60, MinHash 70, sharder 75, combiner 80 and database 25. Thus, the sampler 30, FFT 40, energy streamer 50, energy hasher 60, MinHash 70, sharder 75, combiner 80 and database 25 may be implemented in device 500 as hardware, firmware, software, or a combination thereof and, thus, the device 500 and its components may provide means for performing functions described herein as performed by the sampler 30, FFT 40, energy streamer 50, energy hasher 60, MinHash 70, sharder 75, combiner 80 and database 25, respectively.

The processor 20 can be a variety of various processors including dual microprocessor and other multi-processor architectures. The memory 504 can include volatile memory or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 506 may be operably connected to the device 500 via, for example, an I/O Interfaces (e.g., card, device) 518 and an I/O Ports 510. The disk 506 can include, but is not limited to, devices like a magnetic disk drive, a solid state disk drive, a floppy disk drive, a tape drive, a Zip drive, a flash memory card, or a memory stick. Furthermore, the disk 506 can include optical drives like a CD-ROM, a CD recordable drive (CD-R drive), a CD rewriteable drive (CD-RW drive), or a digital video ROM drive (DVD ROM). The memory 504 can store processes 514 or data 516, for example. The disk 506 or memory 504 can store an operating system that controls and allocates resources of the device 500. The disk 506 or memory 504 may have stored therein the database 25 or the database 25 may be distributed among a number of local or remote storage.

The bus 508 can be a single internal bus interconnect architecture or other bus or mesh architectures. While a single bus is illustrated, it is to be appreciated that device 500 may communicate with various devices, logics, and peripherals using other busses that are not illustrated (e.g., PCIE, SATA, Infiniband, 1394, USB, Ethernet). The bus 508 can be of a variety of types including, but not limited to, a memory bus or memory controller, a peripheral bus or external bus, a crossbar switch, or a local bus. The local bus can be of varieties including, but not limited to, an industrial standard architecture (ISA) bus, a microchannel architecture (MCA) bus, an extended ISA (EISA) bus, a peripheral component interconnect (PCI) bus, a universal serial (USB) bus, and a small computer systems interface (SCSI) bus.

The device 500 may interact with input/output devices via I/O Interfaces 518 and I/O Ports 510. Input/output devices can include, but are not limited to, a keyboard, a microphone, a pointing and selection device, cameras, video cards, displays, disk 506, network devices 520, and the like. The I/O Ports 510 can include but are not limited to, serial ports, parallel ports, and USB ports.

The device 500 can operate in a network environment and thus may be connected to network devices 520 via the I/O Interfaces 518, or the I/O Ports 510. Through the network devices 520, the device 500 may interact with a network. Through the network, the device 500 may be logically connected to remote computers. The networks with which the device 500 may interact include, but are not limited to, a local area network (LAN), a wide area network (WAN), and other networks. The network devices 520 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4) and the like. Similarly, the network devices 520 can connect to WAN technologies including, but not limited to, point to point links, circuit switching networks like integrated services digital networks (ISDN), packet switching networks, and digital subscriber lines (DSL). While individual network types are described, it is to be appreciated that communications via, over, or through a network may include combinations and mixtures of communications.

DEFINITIONS

The following includes definitions of selected terms employed herein. The definitions include various examples or forms of components that fall within the scope of a term and that may be used for implementation. The examples are not intended to be limiting. Both singular and plural forms of terms may be within the definitions.

"PCM" stands for Pulse Code Modulation which is the format in which most digital audio is processed. PCM is a way of encoding audio impulses which are then played out a speaker and the result of these pulses is the sound that we identify as the content. PCM at a time based stream of numbers (typically processed as either bytes or floating point numbers).

"Sample Rate" refers to the number of samples that are captured per second. The audio that we hear is a continuous stream, it is not discrete. Computers work in discrete intervals, so a computer recording audio must take samples (numbers) at a specific sample rate. Traditionally, high fidelity audio such as PCM was captured at a sample rate of 44100 Hz. But the sample rate may be anything that designer may wish. So, for example, a sample rate may be 8,000 Hz. This means that 8,000 samples (numbers) of audio are captured every second.

"Window Size" refers to the size of the discrete chunk of audio processed within a window. For example, if the window size is 4,000, there are two windows in 1 second of 8,000 Hz audio.

"Window Overlap" refers to how much overlap (in samples) there is between a window of audio and the next window of audio. In the example above for Window Size, we assumed a 0 window overlap. However, if the window overlap was set to 1000 and the window size was set to 4,000, there would be 8 windows in 1 second of 8,000 Hz audio. The first window would be from 0-4,000 ms, the second window would be from 1000 ms-5000 ms, the third would be from 2000 ms-6000 ms, and so on. As you can see window overlap results in the same samples of audio being processed multiple times. The result of window overlap in the sampled audio is a more accurate representation of the audio.

"Time Domain" is a term used to refer to audio in PCM format. PCM is audio impulses encoded over time. So each new impulse refers to a later time. The 8,000th impulse of 8,000 Hz encoded audio is at the 1 second mark. Typically audio is not processed in the time domain, but rather in the frequency domain.

"Frequency Domain" refers to analyzing the frequency components of a given segment of audio. To convert audio from the time domain (PCM) to the frequency domain, the Fourier transform is typically utilized.

"FFT" or "Fast Fourier Transform" is an algorithm which converts a segment audio from the time domain to the frequency domain. The Fourier transform is a theoretical algorithm utilizing integration but it is not discrete. The FFT (sometimes referred to as the Discrete Fourier transform or DFT) is a computer algorithm commonly used in DSP which converts audio from the time domain to the frequency domain. The result of the FFT is a data structure composed of frequency "bins". Each frequency bin is a mapping from a frequency range to a magnitude. For example, a one second FFT of a sine wave playing at 4,000 Hz would have a single bin at 4,000 Hz with a high value. Two sine waves playing at 2000 Hz and 4,000 Hz would theoretically have 2 bins, one at 2000 Hz and one at 4,000 Hz each with about equal magnitudes. Audio in real life though is composed of many frequencies so there are typically many frequency bins for the FFT of any given audio sample.

"Content" corresponds to still images, segments of audio media, video media, or audio/visual (AV) media and include information that is embodied, stored, transmitted, received, processed, or otherwise used with at least one medium. Common media content formats include FLV format (flash video), Windows Media Video, RealMedia, Quicktime, MPEG, MP3, DivX, JPEGs, and Bitmaps. As used herein, the terms "media clips", "media content," "information content," and "content" may be used interchangeably.

"Data store" or "database," as used herein, refers to a physical or logical entity that can store data. A data store may be, for example, a database, a table, a file, a list, a queue, a heap, a memory, a register, and so on. A data store may reside in one logical or physical entity or may be distributed between two or more logical or physical entities.

"Logic," as used herein, includes but is not limited to hardware, firmware, software or combinations of each to perform a function(s) or an action(s), or to cause a function or action from another logic, method, or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

In broadcasting, "playout" is a term for the transmission of radio or TV channels from the broadcaster into broadcast networks that delivers the content to the audience.

"Signal," as used herein, includes but is not limited to one or more electrical or optical signals, analog or digital signals, data, one or more computer or processor instructions, messages, a bit or bit stream, or other means that can be received, transmitted, or detected.

"Software," as used herein, includes but is not limited to, one or more computer or processor instructions that can be read, interpreted, compiled, or executed and that cause a computer, processor, or other electronic device to perform functions, actions or behave in a desired manner. The instructions may be embodied in various forms like routines, algorithms, modules, methods, threads, or programs including separate applications or code from dynamically or statically linked libraries. Software may also be implemented in a variety of executable or loadable forms including, but not limited to, a stand-alone program, a function call (local or remote), a servlet, an applet, instructions stored in a memory, part of an operating system or other types of executable instructions. It will be appreciated by one of ordinary skill in the art that the form of software may depend, for example, on requirements of a desired application, the environment in which it runs, or the desires of a designer/programmer or the like. It will also be appreciated that computer-readable or executable instructions can be located in one logic or distributed between two or more communicating, co-operating, or parallel processing logics and thus can be loaded or executed in serial, parallel, massively parallel and other manners.

Suitable software for implementing the various components of the example systems and methods described herein may be produced using programming languages and tools like Java, Pascal, C#, C++, C, CGI, Perl, SQL, APIs, SDKs, assembly, firmware, microcode, or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User" or "consumer," as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A method of audio fingerprinting comprising:
   obtaining audio samples of a piece of audio, each of the audio samples corresponding to a specific time;
   generating frequency representations of the audio samples, the frequency representations being divided in frequency bands;
   identifying energy regions in the frequency bands, each of the energy regions being one of an increasing energy region and a decreasing energy region, an increasing energy region defined as a time region within one of the frequency bands during which audio energy increases from a start time to an end time of the time region and a decreasing energy region defined as a time region within one of the frequency bands during which audio energy decreases from a start time to an end time of the time region;
   analyzing portions of the identified energy regions appearing within time windows to generate hashes of features of the piece of audio, each hash of features corresponding to portions of the identified energy regions appearing in a respective time window, each feature defined as a numeric value that encodes information representing: a frequency band of an energy region appearing in the respective time window, whether the energy region appearing in the respective time window is an increasing energy region or whether the energy region appearing in the respective time window is a decreasing energy region, and a placement of the energy region appearing in the respective time window, the placement of the energy region appearing in the respective time window corresponding to one of:
      whether the energy region appearing in the respective time window starts before and ends after the respective time window,
      whether the energy region appearing in the respective time window starts before and ends within the respective time window,
      whether the energy region appearing in the respective time window starts within and ends after the respective time window, and
      whether the energy region appearing in the respective time window starts within and ends within the respective time window; and
   storing each hash of features together with the specific time,
   wherein the frequency bands include forty four frequency bands whose bandwidth decrease logarithmically from a first frequency band that starts at 200 Hz to a forty fourth frequency band that ends at 3300 Hz.

2. The method of claim 1, comprising:
   converting each hash of features to a MinHash representation of the features or MinHash values; and
   storing the MinHash values together with the specific time.

3. The method of claim 1, comprising:
   converting each hash of features to a MinHash representation of the features having one hundred MinHash values;
   sharding the one hundred MinHash values with a shard size of five to obtain twenty rows or groups of five MinHash shard values;

combining the five MinHash shard values within a row or group into a 64 bit number to obtain a fingerprint hash having twenty 64 bit numbers; and storing the fingerprint hash together with the specific time.

4. The method of claim 1, wherein the obtaining the audio samples of the piece of audio includes:

sampling the piece of audio at 8 kHz using a sampling window size of 4096 samples and a window overlap of 31/32.

5. The method of claim 1, wherein each of the time windows has a window size of 1000 milliseconds and a window overlap of 950 milliseconds.

6. A system for audio fingerprinting comprising:

a sampler configured to obtain audio samples of a piece of audio, each of the audio samples corresponding to a specific time;

a transformer configured to transform the audio samples into frequency representations of the audio samples, the frequency representations being divided in frequency bands;

an energy streamer configured to identify energy regions in the frequency bands, each of the energy regions being one of an increasing energy region and a decreasing energy region, an increasing energy region defined as a time region within a frequency band, of the frequency bands, during which audio energy increases from a start time to an end time of the time region and a decreasing energy region defined as a time region within a frequency band, of the frequency bands, during which audio energy decreases from a start time to an end time of the time region;

an energy hasher configured to analyze portions of the identified energy regions appearing within time windows to generate hashes of features of the piece of audio, each hash of features corresponding to portions of the identified energy regions appearing in a respective time window, each feature defined as a numeric value that encodes information representing: a frequency band of an energy region appearing in the respective time window, whether the energy region appearing in the respective time window is an increasing energy region or whether the energy region appearing in the respective time window is a decreasing energy region, and a placement of the energy region appearing in the respective time window, the placement of the energy region appearing in the respective time window corresponding to one of:

whether the energy region appearing in the respective time window starts before and ends after the respective time window, whether the energy region appearing in the respective time window starts before and ends within the respective time window, whether the energy region appearing in the respective time window starts within and ends after the respective time window, and whether the energy region appearing in the respective time window starts within and ends within the respective time window; and a non-transitory storage medium configured to store each hash of features together with the specific time, a MinHash hasher configured to convert each hash of features to a MinHash representation of the features having one hundred MinHash values;

a sharder configured to shard the one hundred MinHash values with a shard size of five to obtain twenty rows or groups of five MinHash shard values;

a combiner configured to combine the five MinHash shard values within a row or group into a 64 bit number to obtain a fingerprint hash having twenty 64 bit numbers; and the non-transitory storage medium or another non-transitory storage medium configured to store the fingerprint hash and the specific time.

7. The system of claim 6, comprising:

a MinHash hasher configured to convert each hash of features to a MinHash representation of the features or MinHash values; and the non-transitory storage medium or another non-transitory storage medium is configured to store the MinHash values and the specific time.

8. The system of claim 6, comprising:

a sampler configured to obtain the audio samples of the piece of audio by sampling the piece of audio at 8 kHz using a sampling window size of 4096 samples and a window overlap of 31/32.

9. The system of claim 6, wherein the frequency bands include forty four frequency bands ranging from a first frequency band that starts at 200 Hz to a forty fourth frequency band that ends at 3300 Hz.

10. The system of claim 6, wherein the frequency bands include forty four frequency bands whose bandwidth decrease logarithmically from a first frequency band that starts at 200 Hz to a forty fourth frequency band that ends at 3300 Hz.

11. The system of claim 6, wherein each of the time windows has a window size of 1000 milliseconds and a window overlap of 950 milliseconds.

12. A device for audio fingerprinting comprising:

a processor; and a non-transitory computer-readable medium, the processor configured to receive audio samples of a piece of audio, each of the audio samples corresponding to a specific time, process the audio samples, and compare the processed audio samples to processed audio samples stored in the non-transitory computer-readable medium to at least one of identify or synchronize the piece of audio, wherein the processor is configured to process the audio samples by:

transforming the audio samples into frequency representations of the audio samples, the frequency representations being divided in frequency bands;

identifying energy regions within the frequency bands, each of the energy regions being one of an increasing energy region and a decreasing energy region, an increasing energy region defined as a time region within one of the frequency bands during which audio energy increases from a start time to an end time of the time region and a decreasing energy region defined as a time region within one of the frequency bands during which audio energy decreases from a start time to an end time of the time region;

analyzing portions of the identified energy regions appearing within time windows to generate hashes of features of the piece of audio, each hash of features corresponding to portions of the identified energy regions appearing in a respective time window, each feature defined as a numeric value that encodes information representing: a frequency band of an energy region appearing in the respective time window, whether the energy region appearing in the respective time window is an increasing energy region or whether the energy region appearing in the respective time window is a decreasing energy region, and a placement of the energy region appearing in the respective time window, the placement of the energy region appearing in the respective time window corresponding to one of:

whether the energy region appearing in the respective time window starts before and ends after the respective time window, whether the energy region appearing in the respective time window starts before and ends within the respective time window, whether the energy region appearing in the respective time window starts within and ends after the respective time window, and whether the energy region appearing in the respective time window starts within and ends within the respective time window, wherein the frequency bands include forty four frequency bands whose bandwidth decrease logarithmically from a first frequency band that starts at 200 Hz to a forty fourth frequency band that ends at 3300 Hz.

13. The device of claim 12, wherein the processor is configured to convert each hash of features to a MinHash representation of the features having MinHash values; and the non-transitory storage medium or another non-transitory storage medium is configured to store the MinHash values and the specific time.

14. The device of claim 12, wherein the processor is configured to:

convert each hash of features to a MinHash representation of the features having one hundred MinHash values;

shard the one hundred MinHash values with a shard size of five to obtain twenty rows or groups of five MinHash shard values;

combine the five MinHash shard values within a row or group into a 64 bit number to obtain a fingerprint hash having twenty 64 bit numbers; and the non-transitory storage medium or another non-transitory storage medium is configured to store the fingerprint hash and the specific time.

15. The device of claim 12, wherein the processor is configured to:

obtain the audio samples of the piece of audio by sampling the piece of audio at 8 kHz using a sampling window size of 4096 samples and a window overlap of 31/32.

16. The device of claim 12, wherein the processor sets each of the time windows to have a window size of 1000 milliseconds and a window overlap of 950 milliseconds.

* * * * *